United States Patent
Deng et al.

(10) Patent No.: US 9,749,864 B2
(45) Date of Patent: Aug. 29, 2017

(54) CONTROLLING MOBILE DEVICE ACCESS WITH A PAIRED DEVICE

(71) Applicant: INTERNATIONAL BUSINESS MACHINES CORPORATION

(72) Inventors: Yu Deng, Yorktown Heights, NY (US); Jenny S. Li, Danbury, CT (US); Theresa Y. Tai, Hopewell Junction, NY (US); Liangzhao Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/749,678

(22) Filed: Jun. 25, 2015

(65) Prior Publication Data

US 2016/0381557 A1  Dec. 29, 2016

(51) Int. Cl.
*H04L 29/06* (2006.01)
*H04W 12/08* (2009.01)
(Continued)

(52) U.S. Cl.
CPC ........... *H04W 12/08* (2013.01); *H04L 63/107* (2013.01); *H04L 67/303* (2013.01); *H04W 8/18* (2013.01); *H04W 76/023* (2013.01)

(58) Field of Classification Search
CPC ..... H04W 12/08; H04W 8/18; H04W 76/023; H04L 67/303
(Continued)

(56) References Cited

U.S. PATENT DOCUMENTS 6,988,279 B1 * 1/2006 Kanevsky ........... G06F 21/6218
726/2
8,387,141 B1 * 2/2013 Zhukov ................... H04L 51/12
726/22
(Continued)

FOREIGN PATENT DOCUMENTS

WO     2012141808 A1    10/2012
WO     2014151050 A3    9/2014

OTHER PUBLICATIONS

Decker, C., etal, 'Proximity as a Security Property in a Mobile Enterprise Application Context', IEEE, Proceedings of the 37th Hawaii International Conference on System Sciences—2004, entire document, http://citeseerx.ist.psu.edu/viewdoc/download?doi=10.1.1.133.2718&rep=rep1&type=pdf.*
(Continued)

*Primary Examiner* — Luu Pham
*Assistant Examiner* — Ronald Baum
(74) *Attorney, Agent, or Firm* — Cantor Colburn LLP; William A. Kinnaman, Jr.

(57) ABSTRACT

Embodiments of the disclosure relate to controlling access to a mobile device with a paired device. Aspects include pairing the paired device with the mobile device and defining a security profile for the mobile device. Aspects also include receiving a user access request for a desired action via the mobile device and determining signal strength between the paired device and the mobile device. Aspects further include executing the desired action based on a determination that the signal strength is greater than a threshold in the security profile for the desired action.

10 Claims, 4 Drawing Sheets

(51) Int. Cl.
H04W 76/02 (2009.01)
H04L 29/08 (2006.01)
H04W 8/18 (2009.01)

(58) Field of Classification Search
USPC .......................................................... 726/4
See application file for complete search history.

(56) References Cited

U.S. PATENT DOCUMENTS

| | | | | |
|---|---|---|---|---|
| 8,396,452 | B1* | 3/2013 | Matsuoka | G06F 21/35 455/410 |
| 8,561,138 | B2* | 10/2013 | Rothman | G06F 21/35 455/456.1 |
| 8,595,810 | B1* | 11/2013 | Ben Ayed | H04L 63/0815 713/168 |
| 9,031,536 | B2* | 5/2015 | Fitzgerald | G06F 21/316 455/411 |
| 9,325,850 | B2* | 4/2016 | Tadayon | H04M 3/53 |
| 2004/0181695 | A1* | 9/2004 | Walker | G06F 21/35 726/4 |
| 2006/0056356 | A1* | 3/2006 | Arvelo | H04W 52/286 370/332 |
| 2007/0250920 | A1* | 10/2007 | Lindsay | G06F 21/31 726/7 |
| 2008/0134303 | A1* | 6/2008 | Rekimoto | G01S 5/02 726/4 |
| 2009/0177764 | A1* | 7/2009 | Blatherwick | H04W 4/02 709/221 |
| 2009/0254980 | A1* | 10/2009 | Kanaparti | H04L 12/2818 726/4 |
| 2010/0120406 | A1* | 5/2010 | Banga | G06F 1/3203 455/418 |
| 2011/0296495 | A1* | 12/2011 | Smeets | H04W 12/06 726/4 |
| 2013/0095868 | A1 | 4/2013 | Salsbury et al. | |
| 2013/0267204 | A1* | 10/2013 | Schultz | H04W 12/06 455/411 |
| 2013/0298208 | A1* | 11/2013 | Ayed | G06F 21/00 726/6 |
| 2014/0041043 | A1* | 2/2014 | Ha | H04N 21/4627 726/27 |
| 2014/0068717 | A1* | 3/2014 | Mayes | G06F 21/33 726/3 |
| 2014/0113674 | A1 | 4/2014 | Joseph et al. | |
| 2014/0196116 | A1* | 7/2014 | Maguire | H04W 4/023 726/4 |
| 2014/0230019 | A1* | 8/2014 | Civelli | G06F 21/30 726/4 |
| 2014/0269441 | A1* | 9/2014 | Hyde | H04W 4/24 370/259 |
| 2014/0289822 | A1* | 9/2014 | Wilson | G06Q 20/42 726/5 |
| 2014/0302783 | A1 | 10/2014 | Aiuto et al. | |
| 2014/0380497 | A1 | 12/2014 | Sotos et al. | |
| 2015/0081763 | A1 | 3/2015 | Sipola et al. | |
| 2015/0098393 | A1* | 4/2015 | Tofighbakhsh | H04W 24/02 370/329 |
| 2015/0180716 | A1* | 6/2015 | Aminzade | H04L 41/0816 726/4 |
| 2015/0229630 | A1* | 8/2015 | Smith | H04L 67/42 726/5 |
| 2015/0304603 | A1* | 10/2015 | Yoon | H04W 76/028 348/14.07 |
| 2015/0371026 | A1* | 12/2015 | Gnanasekaran | G06F 21/35 726/7 |

OTHER PUBLICATIONS

RSA/EMC, 'RSA SecurID Software Token Security Best Practices Guide—Version 3', Apr. 2011, EMC Corporation, entire document, http://www.tech.its.iastate.edu/securid/docs/SoftwareTokenSecurityBestPracticesGuide.pdf.*

Apolinarski et al., "PIKE: Enabling Secure Interaction with Piggybacked Key-Exchange", 2013 IEEE International Conference on, pp. 94-102. IEEE, 2013.

Prasad et al; "Efficient device pairing using "Human-Comparable" Synchronized Audiovisual Patterns." In Applied Cryptography and Network Security, pp. 328-345. Springer Berlin Heidelberg, 2008.

* cited by examiner

CONTROLLING MOBILE DEVICE ACCESS WITH A PAIRED DEVICE

BACKGROUND

The present disclosure relates to mobile device access control, and more specifically, to controlling access to a mobile device and applications on the mobile device with a paired device.

The proliferation of smart phones and tablets is changing the way employees want to work. As a result, companies around the world are facing a growing number of requests from employees that want to use their personal mobile devices to access enterprise data, key applications, corporate email, and calendars that they need to do their jobs. Many companies have embraced a bring your own device (BYOD) model which has created a scenario where employees use their personal mobile devices for dual purposes, both personal and business. Many companies that provide mobile device to their employees and companies that follow a BYOD mode, provide mobile device security policies that employees are directed to follow. These policies are designed to ensure the security of sensitive company information on the mobile devices.

For example, in order to access company data, such as specific applications, corporate email, or calendar on a mobile device, a company may require employees to install specific security applications, or enable specific security features, on the mobile device. Such security applications or features often require passwords to simply unlock the mobile device and additional password may be required to launch selected applications. While this kind of security can protect the company's data access on the mobile device, at the same time it is often an inconvenience for the user to enter passwords to complete daily activities on their mobile device, such as making a phone call, texting family and friends or using personal applications.

SUMMARY

According to one embodiment, a method for controlling access to a mobile device with a paired device includes pairing the paired device with the mobile device and defining a security profile for the mobile device. The method also includes receiving a user access request for a desired action via the mobile device and determining signal strength between the paired device and the mobile device. The method further includes executing the desired action based on a determination that the signal strength is greater than a threshold in the security profile for the desired action.

According to another embodiment, a computer program product for controlling access to a mobile device with a paired device, the computer program product including a tangible storage medium readable by a processing circuit and storing instructions for execution by the processing circuit for performing a method that includes pairing the paired device with the mobile device and defining a security profile for the mobile device. The method also includes receiving a user access request for a desired action via the mobile device and determining signal strength between the paired device and the mobile device. The method further includes executing the desired action based on a determination that the signal strength is greater than a threshold in the security profile for the desired action.

According to a further embodiment, a processing system controlling access to a mobile device with a paired device having a processor configured to perform a method. The method includes pairing the paired device with the mobile device and defining a security profile for the mobile device. The method also includes receiving a user access request for a desired action via the mobile device and determining signal strength between the paired device and the mobile device. The method further includes executing the desired action based on a determination that the signal strength is greater than a threshold in the security profile for the desired action.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for controlling access to a mobile device with a paired device are provided. In exemplary embodiments, a mobile device, such as a smart phone or a tablet, is paired with a paired device, such as, another smart phone or tablet, a smartwatch, on another wearable smart device. The mobile device is configured to monitor a signal strength of a communication between the paired device and the mobile device and to responsively control access to the mobile device based on a security profile of the mobile device and the signal strength.

In one embodiment, a user may pair their smart phone with a smart watch and may set up a security profile that increases a level of security of the smart phone as the signal strength between smart phone and the smart watch decreases. For example, the user may configure the smart phone to not require an unlock code to be entered to activate the smart phone when the signal strength between the smart phone and the smart watch is above a first threshold level. Likewise, the user may configure the smart phone to not require an access code to be entered to activate a particular application when the signal strength between the smart phone and the smart watch is above a second threshold level.

Figure 1:
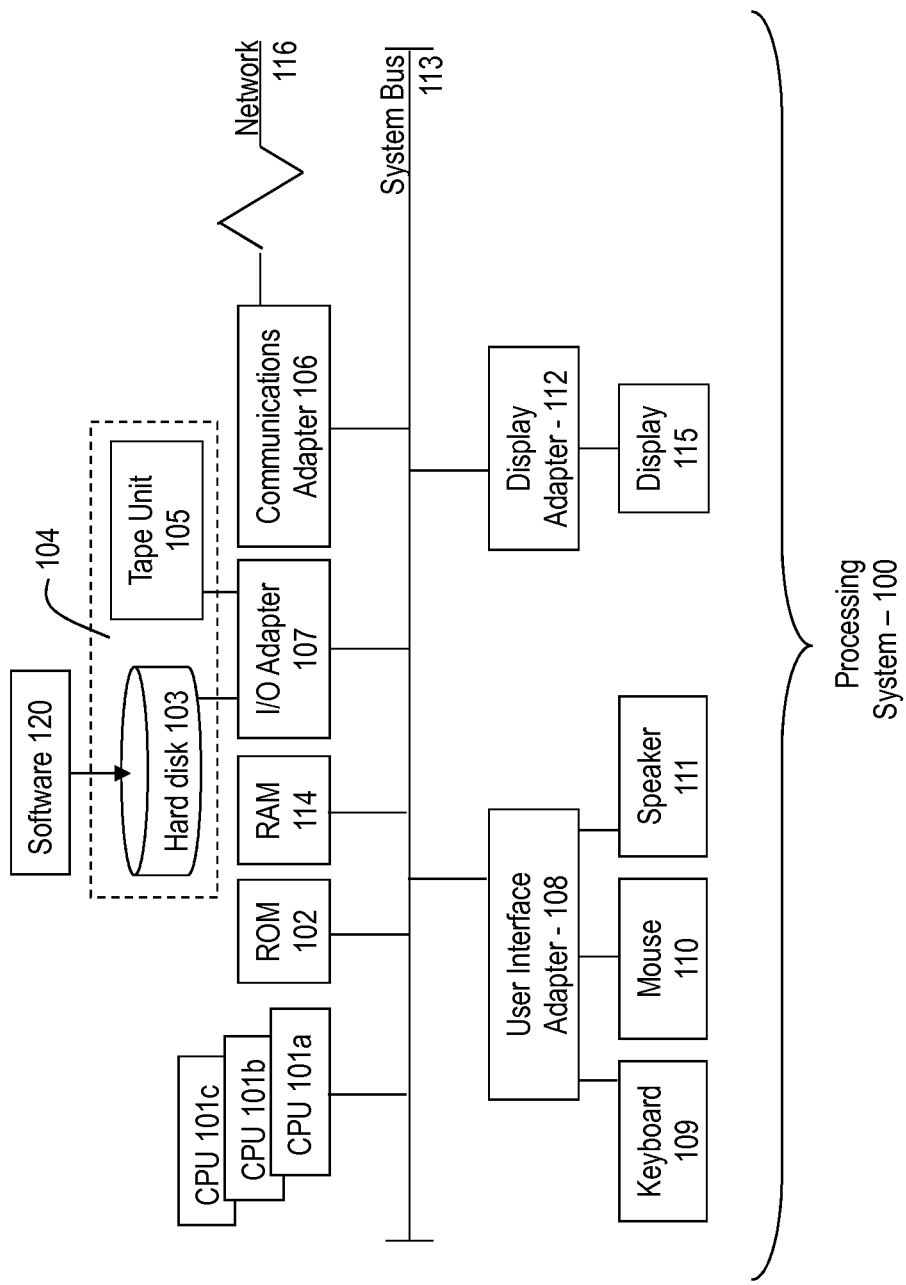
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc.

(collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
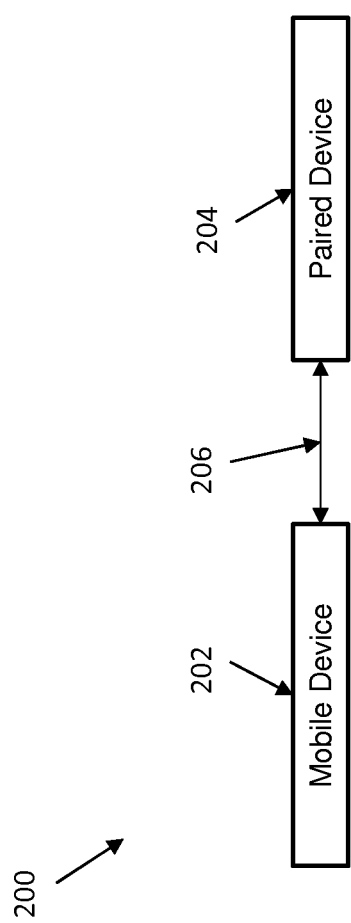
FIG. 2 is a block diagram illustrating a system for controlling access to a mobile device with a paired device in accordance with an exemplary embodiment.

Referring now to FIG. 2, a block diagram illustrating a system 200 for controlling access to a mobile device 202 with a paired device 204 in accordance with an exemplary embodiment is shown. In exemplary embodiments, the mobile device 202 may be any suitable mobile computing device including, but not limited to, a smart phone, a tablet, a smartwatch, a wearable computing device, a personal computer or the like. Likewise, the paired device 204 may be any suitable mobile computing device including, but not limited to, a smart phone, a tablet, a smartwatch, a wearable computing device, a personal computer or the like. In exemplary embodiments, the mobile device 202 and/or the paired device 204 may be a processing system similar to the one shown in FIG. 1.

In exemplary embodiments, the mobile device 202 is paired with the paired device 204 via a wireless communications channel 206. In exemplary embodiments, the wireless communications channel 206 may include any suitable wireless communications channel including, but not limited to, Bluetooth, WiFi, NFC, or the like. In exemplary embodiments, the mobile device 202 is configured to monitor signal strength of wireless communications channel 206 between the paired device 204 and the mobile device 202.

In exemplary embodiments, the mobile device 202 maintains a security profile that is used to control access parameters for the mobile device 202 as well as to applications and data stored on the mobile device 202. In exemplary embodiments, the security profile includes multiple different security levels and the mobile device 202 is configured to responsively select one of the security levels of the security profile to be the active security level of the mobile device 202 based on the signal strength between the paired device 204 and the mobile device 202.

Figure 3:
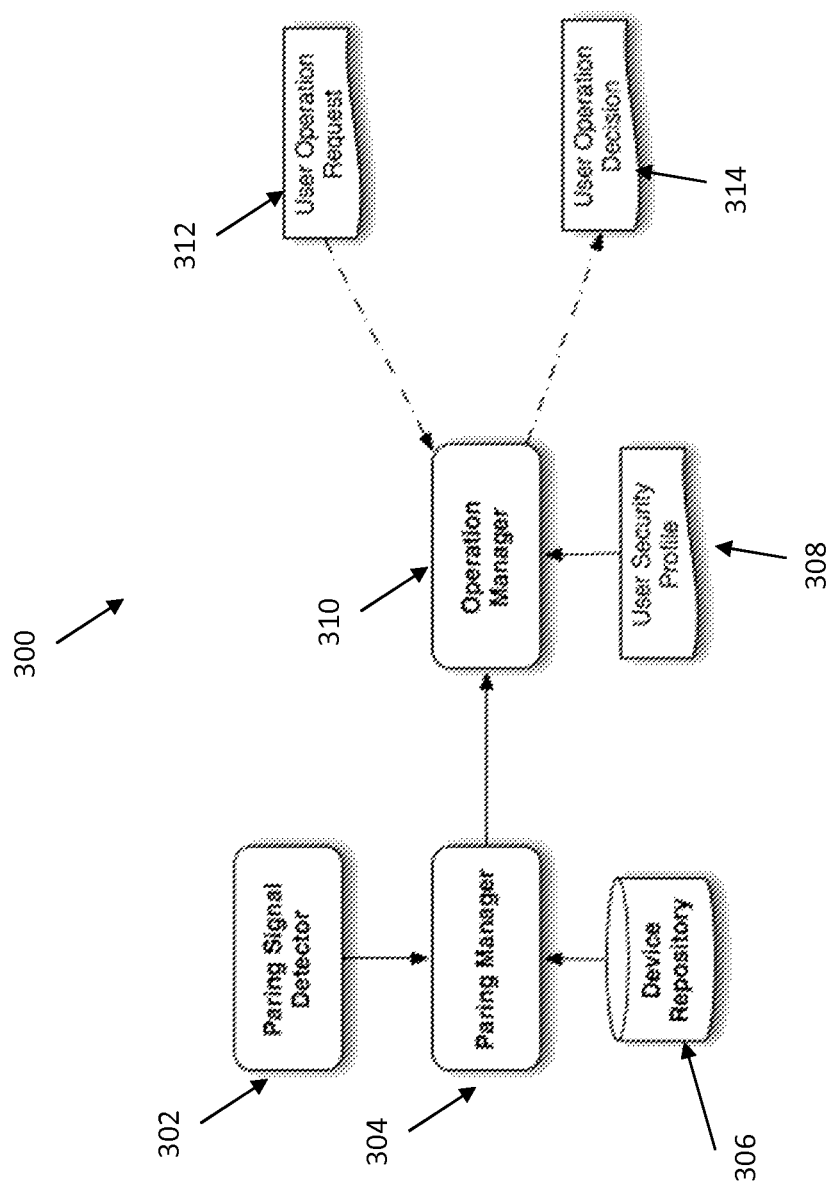
FIG. 3 is a block diagram illustrating a mobile device configured to control access using a paired device in accordance with an exemplary embodiment.

Referring now to FIG. 3, a block diagram illustrating a mobile device 300 configured to control access using a paired device in accordance with an exemplary embodiment is shown. As illustrated, the mobile device 300 includes a paring signal detector 302 that is configured to monitor signals from one or more paired devices. In exemplary embodiments, monitoring the signals from the paired devices includes identifying identity information provided by the paired devices and measuring the signal strength from the paired devices. The mobile device 300 also includes a paring manager 304 that is configured to maintain a list of the paired devices, which may be stored in a device repository 306. The mobile device 300 also includes an operations manager 310 that is configured to control access to the mobile device 300 based on data provided by the paring manager 304 and from a user security profile 310. In exemplary embodiments, the operation manager 310 receives a user operation request 312 from a user and, based on the data provided by the paring manager 304 and from a user security profile 310, provides a user operation decision 314 in response. For example, the user may attempt to launch an application and the operations manager 310 may determine that the signal strength between the mobile device 300 and the paired device exceeds the threshold level provided in the user security profile 308 for accessing the desired application.

In one embodiment, a mobile device is configured for both personal and company usage by a user and the mobile device is paired with a paired device of the user. The user, at the direction of the company's IT department, configures a maximum allowable distance, as determined by a minimum signal strength, between the mobile device and paired device for which specific applications on the mobile device can be accessed by the user. In addition, the user can set up multiple distances and corresponding security/permission levels per his/her company's guidelines or rules. For example, if the paired device is within 3 feet of the mobile device the user may have complete access to the device without using any access codes or a screen unlock code. However, if the mobile device is between 3 feet and 10 feet of the paired device, the mobile device may require a screen unlock code but no access codes for accessing specific applications. If the mobile device is more than 10 feet of the paired device, the mobile device may require a screen unlock code and an access code for a specific application.

In one example, a smart watch is paired with a mobile phone of a user. The user has set up a security profile which allows the mobile phone to be used to make a phone call with no limits on the distance between the smart watch and the mobile phone. Accordingly, when user lends the mobile phone to another person to make a phone call and the other person attempts to use the mobile phone to make a phone call, the operations manager will allow a call to be made without entering a screen unlock code or any additional passwords/passcodes. In addition, the security profile may provide which other functionally may be used without regard to the distance between the smart watch and the mobile phone, such as texting, web browsing, and the like. In another example, the user of the mobile phone would like to access company email, calendar or company applications. In one example, the security profile can be configured to allow the mobile phone to be used to access company email, calendar or company applications when the distance between the smart watch and the mobile phone is less than 5 feet, or when the distance is greater than 5 feet upon the user providing a required company password or other login mechanism.

In exemplary embodiments, the distance between the paired device and the mobile phone may be used to restrict the behavior or usage by a user of certain applications on the mobile device. In one example, the mobile device is a first smart phone that is used by a child and the paired device is a second smart phone that is used by a parent. The parent may configure the security profile on the mobile device to restrict the child's ability to use a mobile payment system associated with the phone based on the distance between the mobile device and the paired device. In exemplary embodiments, the security profile can be used to set spending limits on the child's phone based on the signal strength between the child's phone and the parent's phone. For example, the security profile may set a $100 maximum when the signal strength is between paired phones is greater than 80% signal strength, a $50 limit may be imposed for 50%-80% signal strength, and a $10 limit when the paired device is less than 50% signal strength.

Figure 4:
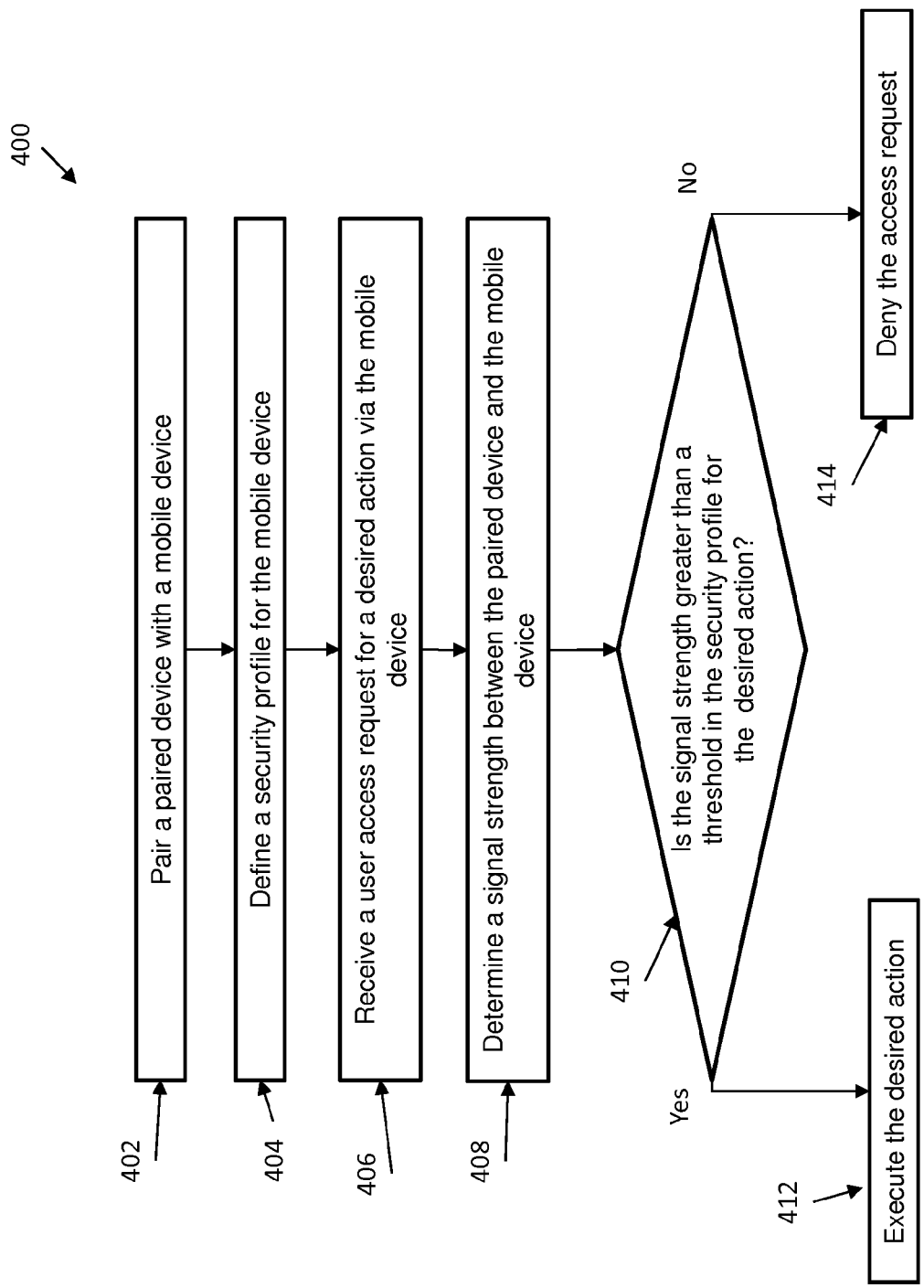
FIG. 4 is a flow diagram illustrating a method for controlling access to a mobile device with a paired device in accordance with an exemplary embodiment.

Referring now to FIG. 4, a flow chart illustrating a method 400 for controlling access to a mobile device with a paired device in accordance with an exemplary embodiment is shown. As shown at block 402, the method 400 includes pairing a paired device with a mobile device. In exemplary embodiments, a user can pair multiple devices with a mobile device and the paired device may be a wearable device or another mobile device. Next, as shown at block 404, the method 400 includes defining a security profile for the mobile device. In exemplary embodiments, the mobile device may include a user interface for use in defining a security profile that allows the user to correlate a distance between the paired device and the mobile device with the signal strength between the paired device and the mobile device. For example, the user interface may display a signal strength between the paired device and the mobile device as the user manipulates the distance between the paired device and the mobile device.

Continuing with reference to FIG. 4, the method 400 includes receiving a user access request for a desired action via the mobile device, as shown at block 406. Next, as shown at block 408, the method 400 includes determining a signal strength between the paired device and the mobile device. At decision block 410, the method 400 includes determining whether the signal strength is greater than a threshold in the security profile associated with the desired action. If the signal strength is greater than the threshold in the security profile for the desired action, the method 400 proceeds to block 412 and executes the desired action. If the signal strength is not greater than the threshold in the security profile for the desired action, the method 400 proceeds to block 414 and denies the user access request. In another embodiment, the user can configure the mobile device to send an exception request to the paired device when an access request on the mobile device is denied. In another embodiment, the user of the paired device can respond to an exception request. If an exception is granted by the user of the paired device, the user of the mobile device can proceed with his/her requested operation on the mobile device.

In exemplary embodiments, the distance between the mobile device and a paired device is used in combination with a security profile to control access to the mobile device and applications on the mobile device. As discussed in more detail above, the signal strength between the mobile device and the paired device can be used as an indication of the distance between the mobile device and the paring device. However, as will be appreciated by those of ordinary skill in the art, other measurements may be used as indicators of the distance between the mobile device and the paring device. For example, in one embodiment, the time between a mobile device sending a message to the paired device and in receiving a response from the paired device can be used as an indication of the distance between the mobile device and a paring device.

In exemplary embodiments, the mobile device may also be configured to constantly monitor the signal strength between the mobile device and the paired device. The mobile device can automatically close any applications that are open if the signal strength between the mobile device and the paired device drops below a threshold level. In exemplary embodiments, the threshold level that is used to automatically close an application may be the same as, or different from, the threshold level used by the mobile device to launch the application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling access to a mobile device with a paired device, comprising:
    pairing the paired device with the mobile device;
    defining a security profile for the mobile device, wherein the security profile includes a plurality of actions capable of being executed by the mobile device, a threshold minimum signal strength for each of the plurality of actions and an authorization level associated with each of the plurality of actions;
    receiving a user access request for a desired action via the mobile device;
    determining a signal strength between the paired device and the mobile device;
    based on a determination that the signal strength is greater than one of the threshold minimums,
        authorizing the execution of the desired action up to the authorization level associated with a highest threshold minimum signal that exceeds the signal strength;
    based on a determination that the signal strength is not greater than one of the threshold minimums:
        denying the user access request;
        transmitting an exception request by the mobile device to the paired device requesting permission to execute the desired action while the signal strength is less than a corresponding a threshold minimum of the desired action; and
        executing the desired action based on receiving an authorization to the exception request, wherein execution of the desired action is performed without adjusting the signal strength between the paired device and the mobile device;
    based on a determination that the signal strength is not greater than the one of the threshold minimums but is greater than a second one of the threshold minimums:
        prompting a user for an access code to proceed with the desired action;
        receiving the access code from the user; and
        based on determining that the access code provided is valid,
            executing the desired action; and
    based on a determination that the signal strength is not greater than the second one of the threshold minimums, denying the user access request.

2. The method of claim 1, further comprising:
based on a determination that the signal strength is not greater than the threshold:
prompting a user for an access code to proceed with the desired action;
receiving the access code from the user; and
based on determining that the access code provided is valid, executing the desired action.

3. The method of claim 1, wherein the paired device is one of a wearable device, a smart phone, and a tablet device.

4. The method of claim 1, wherein the mobile device includes a user interface for use in defining a security profile that displays the signal strength between the paired device and the mobile device.

5. A computer program product for controlling access to a mobile device with a paired device, the computer program product comprising:
a non-transitory storage medium readable by a processing circuit and storing instructions for execution by the processing circuit for performing a method comprising:
pairing the paired device with the mobile device;
defining a security profile for the mobile device, wherein the security profile includes a plurality of actions capable of being executed by the mobile device, a threshold minimum signal strength for each of the plurality of actions and an authorization level associated with each of the plurality of actions;
receiving a user access request for a desired action via the mobile device;
determining a signal strength between the paired device and the mobile device;
based on a determination that the signal strength is greater than one of the threshold minimums, authorizing the execution of the desired action up to the authorization level associated with a highest threshold minimum signal that exceeds the signal strength;
based on a determination that the signal strength is not greater than one of the threshold minimums:
denying the user access request;
transmitting an exception request by the mobile device to the paired device requesting permission to execute the desired action while the signal strength is less than a corresponding a threshold minimum of the desired action; and
executing the desired action based on receiving an authorization to the exception request, wherein execution of the desired action is performed without adjusting the signal strength between the paired device and the mobile device;
based on a determination that the signal strength is not greater than the one of the threshold minimums but is greater than a second one of the threshold minimums:
prompting a user for an access code to proceed with the desired action;
receiving the access code from the user; and
based on determining that the access code provided is valid,
executing the desired action; and
based on a determination that the signal strength is not greater than the second one of the threshold minimums,
denying the user access request.

6. The computer program product of claim 5, wherein the method further comprises:
based on a determination that the signal strength is not greater than the threshold:
prompting a user for an access code to proceed with the desired action;
receiving the access code from the user; and
based on determining that the access code provided is valid, executing the desired action.

7. The computer program product of claim 5, wherein the paired device is a wearable device.

8. The computer program product of claim 5, wherein the mobile device includes a user interface for use in defining a security profile that displays the signal strength between the paired device and the mobile device.

9. A system for controlling access to a mobile device with a paired device, the system comprising:
a mobile device having a processor configured to:
pair, by the processor, the paired device with the mobile device;
define a security profile for the mobile device, wherein the security profile includes a plurality of actions capable of being executed by the mobile device, a threshold minimum signal strength for each of the plurality of actions and an authorization level associated with each of the plurality of actions;
receive a user access request for a desired action via the mobile device;
determine, by the processor, a signal strength between the paired device and the mobile device;
based on a determination that the signal strength is greater than one of the threshold minimums, authorizing the execution of the desired action up to the authorization level associated with a highest threshold minimum signal that exceeds the signal strength;
based on a determination that the signal strength is not greater than one of the threshold minimums:
deny the user access request;
transmit an exception request by the mobile device to the paired device requesting permission to execute the desired action while the signal strength is less than a corresponding a threshold minimum of the desired action; and
execute the desired action based on receiving an authorization to the exception request, wherein execution of the desired action is performed without adjusting the signal strength between the paired device and the mobile device;
based on a determination that the signal strength is not greater than the one of the threshold minimums but is greater than a second one of the threshold minimums:
prompting a user for an access code to proceed with the desired action;
receiving the access code from the user; and
based on determining that the access code provided is valid,
executing the desired action; and
based on a determination that the signal strength is not greater than the second one of the threshold minimums,
denying the user access request.

10. The system of claim 9, wherein the mobile device includes a user interface for use in defining a security profile that displays the signal strength between the paired device and the mobile device.

* * * * *